United States Patent [19]

Okada et al.

[11] Patent Number: 4,802,745

[45] Date of Patent: Feb. 7, 1989

[54] LIGHT-POLARIZING FILMS

[75] Inventors: Toyokazu Okada; Koji Higashi; Satoshi Taguchi, all of Osaka, Japan

[73] Assignee: Sumitomo Chemical Company, Limited, Osaka, Japan

[21] Appl. No.: 53,656

[22] Filed: May 26, 1987

[30] Foreign Application Priority Data

May 23, 1986 [JP] Japan ................................ 61-119852
Mar. 18, 1987 [JP] Japan ................................ 62-65161

[51] Int. Cl.$^4$ ........................ G02B 5/30; G02B 27/28; F21V 9/14; G02C 7/12
[52] U.S. Cl. .................................... 350/397; 350/398; 252/500; 252/585; 252/502; 528/373; 528/380; 528/502; 428/910; 428/500; 428/515
[58] Field of Search ................ 252/500, 585; 528/373, 528/380, 502; 350/397, 398; 428/910, 500, 515

[56] References Cited

U.S. PATENT DOCUMENTS

| | | | |
|---|---|---|---|
| 2,173,304 | 5/1939 | Land et al. ............................... | 88/65 |
| 2,400,877 | 5/1946 | Dreyer .................................... | 88/65 |
| 2,612,079 | 9/1952 | Mahler .................................... | 88/65 |
| 3,401,152 | 9/1968 | Wessling et al. ....................... | 528/391 |
| 3,532,643 | 10/1970 | Wessling et al. ...................... | 528/373 |
| 4,229,498 | 10/1980 | Suzuki et al. ......................... | 428/212 |
| 4,387,133 | 6/1983 | Ichikawa et al. ..................... | 428/215 |
| 4,508,639 | 4/1985 | Camps et al. ......................... | 252/500 |
| 4,528,118 | 7/1985 | Murase et al. ........................ | 252/500 |
| 4,564,545 | 1/1986 | Okumura et al. ..................... | 428/76 |
| 4,626,304 | 12/1986 | Okumura et al. .................... | 156/163 |

FOREIGN PATENT DOCUMENTS 19196 5/1971 Japan .

OTHER PUBLICATIONS

"Optical Rotatory Dispersion and Circular Dichroism in Organic Chemistry", 1965 Holden–Day pp. 13–14 by: Pierre Crabbe.

*Primary Examiner*—Paul Lieberman
*Assistant Examiner*—Ronald A. Krasnow
*Attorney, Agent, or Firm*—Sughrue, Mion, Zinn, Macpeak & Seas

[57] ABSTRACT

A light-polarizing film is disclosed, comprising a conductive polymer having dichroism and having an unsaturated cyclic structure in the main chain thereof. The light-polarizing film of the invention has good polarization quality and is excellent in durability under high-temperature and high-humidity conditions.

10 Claims, No Drawings

LIGHT-POLARIZING FILMS

FIELD OF THE INVENTION

This invention relates to a light-polarizing film using a conductive polymer.

BACKGROUND OF THE INVENTION

At present, light-polarizing films are produced by adsorbing iodine or one or more dichroic dyes as polarizing matters on a film of polyvinyl alcohol (hereinafter referred to as "PVA") or a derivative thereof oriented by stretching or a polyenic film obtained by orienting a polyene formed by dehydrochlorination of a polyvinyl chloride (hereinafter referred to as "PVC") film or dehydration of a PVA-based film.

Light-polarizing films using iodine as a polarizing matter are excellent in initial polarization quality but weak to water and heat and, hence, involve a problem in durability in the case of using the film under high-temperature and high-humidity conditions for a long period of time. When PVA is used for the light-polarizing film, for improving the durability, there may be considered a method of fast treatment with an aqueous solution containing formalin or boric acid or a method of using a polymer film having a low water vapor transmission as a protective film, but the light-polarizing films by such an improvement are yet insufficient in durability under high-temperature and high-humidity conditions.

Also, light-polarizing films using dichroic dyes as polarizing matters are improved in durability under high-temperature and high-humidity conditions as compared with light-polarizing films using iodine as a polarizing matter, but the improvements are not still satisfactory in the case of using PVA as a base film thereof.

SUMMARY OF THE INVENTION

An object of this invention is, therefore, to solve the aforesaid problems of conventional light-polarizing films and to provide a novel light-polarizing film having good polarization quality and having excellent durability under high-temperature and high-humidity conditions.

This invention has been accomplished as the result of various investigations for solving the above-described problems of conventional light-polarizing films obtained by uniaxially orienting PVA as a base film and adsorbing iodine or dichroic dyes on the oriented film. That is, this invention is concerned with a light-polarizing film comprising a conductive polymer having an unsaturated cyclic structure in the main chain thereof and having dichroism or a conductive polymer precursor soluble in a solvent, the precursor being capable of becoming a conductive polymer by a proper releasing treatment such as heat-treatment, etc.

The term "conductive polymer" referred to in this invention means a polymer which itself has merely a low electric conductivity on a level with semiconductors or electric insulators but which shows a high electric conductivity by the addition of an electron attractive compound or an electron donative compound i.e., when doped.

DETAILED DESCRIPTION OF THE INVENTION

The light-polarizing film of this invention can be obtained by any of the following embodiments.

(1) A light-polarizing film of this invention having excellent performance is obtained by highly uniaxially stretching a film-formable and stretchable conductive polymer having an unsaturated cyclic structure in the main chain thereof, having dichroism, and showing polarization quality with a lapse of stretching, and controlling the thickness of the film thus obtained so that the film has a proper light transmittance.

Also, a light-polarizing film of this invention, which is highly uniaxially oriented and is composed of a conductive polymer having dichroism and represented by formula (VI) shown below (obtained from a conductive polymer precursor represented by formula (I) shown below), a conductive polymer, i.e., poly(thiophene vinylene) (hereinafter referred to as "PTV") represented by formula (VII) shown below (obtained from a conductive polymer precursor represented by formula (II) or (III) shown below), a conductive polymer represented by formula (VIII) shown below (obtained from a conductive polymer precursor represented by formula (IV) shown below), or a conductive polymer, i.e., poly(p-phenylene vinylene) (hereinafter referred to as "PPV") represented by formula (IX) shown below (obtained from a conductive polymer precursor represented by formula (V) shown below), is obtained by forming a film using a solvent-soluble conductive polymer precursor represented by formulae (I), (II), (III), (IV), or (V) shown below by a casting method, highly uniaxially orienting the film by subjecting to an orienting treatment during or after the formation of the film, and then subjecting to a proper releasing treatment such as heat-treatment, etc. during or after the orientation, and controlling the thickness of the precursor film thus obtained so that the light-polarizing film has a proper light transmittance.

Formula (I) is represented as follows:

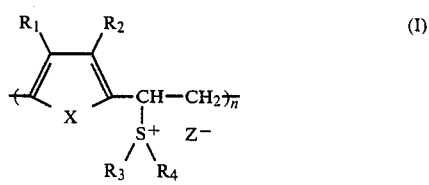

wherein X represents a sulfur atom or an oxygen atom; $R_1$ and $R_2$, which may be the same or different, each represents a hydrogen atom, an alkyl group having from 1 to 4 carbon atoms, a nitrile group, a halogen atom, or a trihalomethyl group; $R_3$ and $R_4$, which may be the same or different, each represents a hydrogen atom or an alkyl group having from 1 to 4 carbon atoms; $Z^-$ represents an anion; and n represents an integer of at least 5.

Formulae (II) and (III) are each represented as follows:

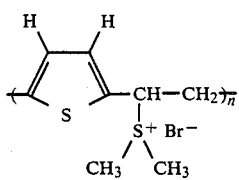
(II)

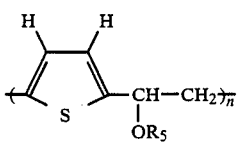
(III)

wherein n represents an integer of at least 5; and in formula (III), $R_5$ represents a hydrogen atom or an alkyl group having from 1 to 4 carbon atoms.

Formula (IV) is represented as follows:

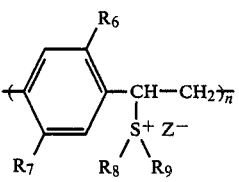
(IV)

wherein $R_6$ and $R_7$, which may be the same or different, each represents a hydrogen atom, an alkyl group having from 1 to 4 carbon atoms, a nitrile group, an alkoxy group having from 1 to 4 carbon atoms, a halogen atom, or a trihalomethyl group; $R_8$ and $R_9$, which may be the same or different, each represents a hydrogen atom or an alkyl group having from 1 to 4 carbon atoms; $Z^-$ represents an anion; and n represents an integer of at least 5.

Formula (V) is represented as follows:

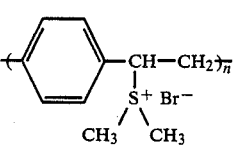
(V)

wherein n represents an integer of at least 5.

Formula (VI) is represented as follows:

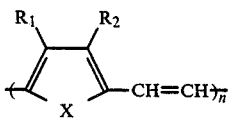
(VI)

wherein X represents a sulfur atom or an oxygen atom; $R_1$ and $R_2$, which may be the same or different, each represents a hydrogen atom, an alkyl group having from 1 to 4 carbon atoms, a nitrile group, a halogen atom, or a trihalomethyl group; and n represents an integer of at least 5.

Formula (VII) is represented as follows:

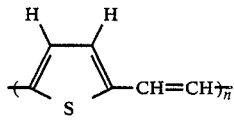
(VII)

wherein n represents an integer of at least 5.

Formula (VIII) is represented by as follows:

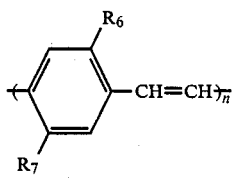
(VIII)

wherein $R_6$ and $R_7$, which may be the same or different, each represents a hydrogen atom, an alkyl group having from 1 to 4 carbon atoms, a nitrile group, an alkoxy group having from 1 to 4 carbon atoms, a halogen atom, or a trihalomethyl group; and n representes an integer of at least 5.

Formula (IX) is represented as follows:

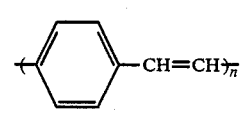
(IX)

wherein n represents an integer of at least 5.

Also, for substantially controlling the thickness of the conductive polymer, the following methods can be used.

(2) An excellent light-polarizing film of this invention composed of a highly uniaxially oriented conductive polymer and a base polymer is obtained by adsorbing a conductive polymer having dichroism dissolved in a solvent on a base polymer film which can be swollen with the solvent or has a solubility in the solvent by a dipping method to form a composite film composed of the conductive polymer and the base polymer and then uniaxially stretching the composite film.

Also, in the case of using a conductive polymer precursor soluble in a solvent, which is represented by formulae (I), (II), (III), (IV), or (V), an excellent light-polarizing film of this invention composed of a conductive polymer having dichroism and represented by formulae (VI), (VII), (VIII), or (IX) and a base polymer is obtained by adsorbing a conductive polymer precursor dissolved in a solvent on a base polymer film which can be swollen with the solvent or has a solubility in the solvent by a dipping method to form a composite film composed of the conductive polymer precursor and the base polymer, uniaxially stretching the composite film to thereby highly uniaxially stretch the conductive polymer precursor, and then subjecting to a proper releasing treatment such as heat-treatment, etc., during or after the stretching.

In the case of using PTV shown by formula (VII) or PPV shown by formula (IX) as a conductive polymer, a base polymer film composed of a thermoplastic resin such as PVC, PVA, a saponified ethylene-vinyl alcohol copolymer (hereinafter referred to as "saponified EVA"), polysulfone (hereinafter referred to as "PSf"), polycarbonate (hereinafter referred to as PC), etc., is dipped in a dimethylfomamide (hereinafter referred to as "DMF") solution of from 1 to 3% by weight of a PTV precursor shown by formula (II) or (III) or an aqueous solution of from 0.5 to 2% by weight of a PPV precursor shown by formula (V) and then dried in air, preferably in a nitrogen gas atmosphere, to provide a composite film of the PTV precursor or PPV precursor and the base polymer in which a PTV precursor film or a PPV precursor film of from 0.5 μm to 1.5 μm in thickness is adsorbed on the base polymer film. Then, the composite film is stretched 3 times or more, preferably 4 times or more, at a temperature suitable for each film, i.e., from 80° to 100° C. in the case of using PVA as the thermoplastic resin, from 70° to 120° C. in the case of using PVC, from 60° to 100° C. in the case of using saponified EVA, from 160° to 220° C. in the case of using PSf, and from 140° to 180° C. in the case of using PC, respectively, and thereafter is heat-treated at a temperature of from 100° C. to 200° C. depending on the thermal resistance of the base film, whereby an excellent light-polarizing film of this invention containing PTV or PPV as the conductive polymer is obtained.

(3) An excellent light-polarizing film of this invention composed of a conductive polymer having dichroism is obtained by adsorbing in a highly uniaxially oriented state the conductive polymer having dichroism dissolved in a solvent on a uniaxially stretched base polymer film which can be swollen with the solvent or has a solubility in the solvent by a dipping method.

Also, in the case of using a conductive polymer precursor soluble in a solvent, which is represented by formulae (I), (II), (III), (IV), or (V), an excellent light-polarizing film of this invention composed of a conductive polymer having dichroism and represented by formulae (VI), (VII), (VIII), or (IX) is obtained by adsorbing in a highly uniaxially oriented state the conductive polymer precursor dissolved in a solvent on a uniaxially stretched base polymer film which can be swollen with the solvent or has a solubility in the solvent by a dipping method and then subjecting to a proper releasing treatment such as heat-treatment, etc.

Also, the light-polarizing film of this invention can be obtained by the following methods.

(4) An excellent light-polarizing film of this invention composed of a conductive polymer is obtained by mixing a conductive polymer having dichroism dissolved in a solvent and a base polymer soluble in the solvent at a suitable mixing ratio for giving a suitable final light absorbance, forming the mixture into a composite film composed of the conductive polymer and the base polymer by a casting method, and then uniaxially orienting the composite film.

Also, in the case of using a conductive polymer precursor soluble in a solvent, which is represented by formulae (I), (II), (III), (IV), or (V), the conductive polymer precursor dissolved in a solvent is mixed with a base polymer soluble in the solvent at a suitable mixing ratio for giving a suitable final light absorbance, and the mixture is formed into a composite film of the conductive polymer precursor and the base polymer by a casting method. Then, the composite film is uniaxially stretched to thereby highly uniaxially orient the conductive polymer precursor and thereafter, subjected to a proper releasing treatment such as heat-treatment, etc. during or after the stretching, whereby an excellent light-polarizing film of this invention composed of the conductive polymer having dichroism and represented by formulae (VI), (VII), (VIII), or (IX) is obtained.

In the case of using PTV shown by formula (VII) as the conductive polymer, a DMF solution of from 10 to 20% by weight of a resin soluble in DMF, such as PSf, is prepared, the solution thus prepared is mixed with the PTV precursor shown by formula (II) or (III) in such a manner that the content of the precursor becomes from 0.3 to 2% by weight, preferably from 0.5 to 1% by weight, based on the weight of PSf, and then a composite film of the PTV precursor and PSf having from 10 μm to 200 μm in thickness is formed using the mixture by a casting method at a temperature of from 70° C. to 150° C., preferably from 70° C. to 100° C., for preventing the occurrence of unnecessary releasing reaction of the PTV precursor. Then, the composite film is stretched 3 times or more, preferably 4 times or more, at a temperature of from 160° C. to 220° C. and, at the same time, heat-treated, whereby an excellent light-polarizing film of this invention containing PTV is obtained.

In the case of using PPV shown by formula (IX) as the conductive polymer, an aqueous solution of from 5 to 15% by weight of a water-soluble resin such as PVA is prepared, the aqueous solution is mixed with a PPV precursor shown by formula (V) in such a manner that the content of the PPV precursor becomes from 0.1 to 5% by weight, preferably from 0.35 to 2% by weight, based on the weight of PVA, and a composite film of the PPV precursor and PVA having from 10 μm to 200 μm in thickness is prepared at room temperature by a casting method. Then, the composite film is stretched 3 times or more, and preferably 4 times or more, at a temperature of from 80° C. to 100° C. and then heat-treated for 30 minutes at about 100° C., whereby an excellent light-polarizing film containing PPV is obtained.

Furthermore, the light-polarizing film of this invention can also be obtained by the following methods.

(5) An excellent light-polarizing film of this invention is obtained by melt-mixing a conductive polymer having dichroism and a base polymer having compatibility with the conductive polymer at a proper mixing ratio, forming the mixture into a film by means of an extruder, etc., and thereafter uniaxially stretching the film thus formed to thereby highly uniaxially orient the conductive polymer.

Now, in this invention, if necessary, a light-polarizing film is obtained by using a plurality of conductive polymers having dichroism by any proper combination of the methods (1) to (5) described above.

That is, for example, an excellent light-polarizing film of this invention containing two kinds of conductive polymers having dichoism is obtained by forming a film using a molten mixture of a conductive polymer and a base polymer using an extruder, etc., adsorbing thereon a conductive polymer precursor dissolved in a solvent which swells the base polymer film or dissolves therein the base polymer film by a dipping method to form a composite film composed of the conductive polymer, the conductive polymer precursor, and the base polymer, stretching the composite film, and then or simultaneously subjecting to a proper releasing treatment such as heat-treatment, etc.

Also, a light-polarizing film containing two kinds of conductive polymers having dichroism is obtained by forming a composite film composed of a conductive polymer precursor and a base polymer by a casting method, etc., adsorbing a conductive polymer precursor dissolved in a solvent which swells the base polymer film or dissolves therein the base polymer film to form a composite film composed of two kinds of conductive polymer precursors and the base polymer, and then subjecting to stretching and a proper releasing treatment such as heat-treatment, etc.

Furthermore, by adding an electron attractive compound or an electron donative compound (hereinafter referred to as "dopant") to a light-polarizing film composed of a conductive polymer having dichroism and represented by formulae (VI), (VII), (VIII), or (IX) to perform so-called doping, the electron state of the conductive polymer can be changed, whereby a light-polarizing film having a changed light-absorbing region, that is, having a changed color is obtained. Examples of the dopant which can be used in this invention are iodine, ferric chloride, arsenic pentafluoride, sulfur trioxide, sulfuric acid, sodium, lithium, etc.

In the case of using PTV shown by formula (VII) as a conductive polymer, the color of the light-polarizing film can stably be changed by doping the film with sulfuric acid. For example, by doping the PTV-containing light-polarizing film prepared by the method (2) described above with sulfuric acid, the light-absorbing region thereof is expanded to a long wavelength side, and at the same time, a light-polarizing film having high durability such that the polarization quality thereof does not change for a long period of time longer than 1,000 hours in the state where no protective film is provided in the durability test under high-temperature and high-humidity conditions of 85° C. and 90% RH is obtained.

Also, a light-polarizing film using at least one conductive polymer and at least one dichroic dye is obtained by combining any of the aforesaid methods (1) to (5) and the conventional method for producing a light-polarizing film using dichroic dyes by, for example, dipping a light-polarizing film containing a conductive polymer prepared by any of the methods (1) to (5) in a solution of a dichroic dye to absorb thereon the dichroic dye, or forming a mixture of a solution of one or more conductive polymers and/or conductive polymer precursors, a base polymer, and one or more dichroic dyes at a suitable mixing ratio into a film by a casting method, stretching the film and, at the same time or thereafter, subjecting to a releasing treatment such as heat-treatment, etc. As the dye for use in this case, any dyes having high dichroism and having good compatibility with the conductive polymer and/or the precursor thereof and further the base polymer used can be used, and examples thereof are azo dyes and anthraquinone dyes as well as quinophthalon dyes, perylene dyes, naphthoquinone dyes, tetrazine dyes, etc.

The conductive polymer for use in this invention shown by formulae (VI), (VII), (VIII), or (IX) and having dichroism can be highly uniaxially oriented and in the case of using a dichroic dye, the production method for the light-polarizing film of this invention is not always limited to the aforesaid methods if it is possible to highly orient both the conductive polymer and the dichroic dye.

The light-polarizing film of this invention may be a film composed of the conductive polymer along having dichroism and represented by formulae (VI), (VII), (VIII), or (IX) or may be a composite film formed by adsorbing or laminating the conductive polymer on other base polymer, followed by uniaxially orienting. As the base polymer in the latter case, there are films of, for example, PVC or derivatives thereof, PVA or derivatives thereof, cellulose acetate or derivatives thereof, and saponified EVA, as well as heat-resistant polymer films of PSf, PC, polyetherimide, polyethersulfone, etc.

Also, any base polymers which can uniaxially orient the conductive polymers having dichroism by the aforesaid methods, etc. may be used in this invention without being limited to the aforesaid materials. Among these materials, the use of the heat-resistant polymer films of PSf, etc., is more preferred in the point of improving the durability of the light-polarizing film of this invention.

For stretching a film composed of the conductive polymer alone shown by formulae (VI), (VII), (VIII), or (IX), a composite film composed of the conductive polymer and a base polymer, a film composed of the conductive polymer precursor alone shown by formulae (I), (II), (III), (IV), or (V), or a composite film composed of the conductive polymer precursor and a base polymer, a method which is the most suitable for the film to be stretched, such as dry uniaxial stretching, wet uniaxial stretching, rolling, etc., may be used in this invention.

To the light-polarizing film of this invention using the conductive polymer having dichroism can be added, if necessary, additives such as ultraviolet inhibitors, stabilizers, etc., for further improving the light stability and heat resistance thereof. Also, in the case of laminating a protective film or supporting film on the light-polarizing film of this invention or in the case of using the light-polarizing film of this invention as a circular polarizer by laminating thereon a quarter-wave plate, etc., it is possible to incorporate the additives in the protective films or supporting films or quarter-wave plates, or an adhesive layer for adhering the aforesaid light-polarizing film to the protective film or the quater-wave plate, or a tacky agent layer for sticking the light-polarizing film to a liquid crystal panel.

Then, the following examples are intended to illustrate this invention but not to limit it in any way.

Polarizing co-efficient referred to in the present invention is defined as follows.

Two sample sheets of polarizing film or polarizing plate are piled one on the other and subjected to measurement of a light transmission curve. The spectrophotometer Type UV-330 made by Hitachi, Ltd. was used.

$$\text{Polarizing Co-efficient} = \sqrt{\frac{H_\| - H_\perp}{H_\| + H_\perp}} \times 100(\%)$$

wherein $H_\|$ is the value measured by piling one light-polarizing film on the other, wherein the polarizing films are piled so that the orientation directions of them are in the same direction (the value is called as light transmittance in placing two identical polarizers in parallel); and $H_\perp$ is the value measured by piling one light-polarizing film on the other, wherein the polarizing films are piled so that the orientation directions of them are crossing with each other (the value is called as light transmittance in placing two identical polarizers on cross axis).

EXAMPLE 1

An aqueous solution of 0.7% by weight of a PPV precursor shown by formula (V) was cast on a polyester film (Mylar ® film, made by Toray Industries, Inc.) to provide a film of the PPV precursor alone having a thickness of about 15 μm. The film was uniaxially stretched 10 times and, thereafter, heat-treated for one hour at 120° C. to provide a light-polarizing film composed of uniaxially stretched PPV alone. The color of the light-polarizing film was yellow, and the properties thereof are shown in Table 1 described hereinbelow.

EXAMPLE 2

A DMF solution of PSf was mixed with a DMF solution of a PTV precursor shown by formula (III) wherein $R_5$ is a methyl group so that the content of the PTV precursor became 0.8% by weight to PSf, and the mixture was formed into a composite film to PSf and the PTV precursor having a thickness of 120 μm by a casting method under the conditions of 100° C. and 30 minutes. Then, the composite film was uniaxially stretched 4 times while heat-treating the PTV precursor at about 180° C. in vacuo, whereby a light-polarizing film composed of PSf and PTV having a thickness of 40 μm was obtained. The properties thereof are shown in Table 1 below.

EXAMPLE 3

An aqueous solution of the PPV precursor as used in Example 1 was mixed with an aqueous solution of PVA having an average polymerization degree of 1,700 and a saponification degree of 99.5% so that the content of the PPV precursor became 1.2% by weight to PVA, and the mixture was cast on a polyester film to form a composite film of PPV precursor and PVA having a thickness of about 50 μm. Then, the composite film was uniaxially stretched 4 times in air at 100° C. and, thereafter, heat-treated for one hour at 120° C. to provide a light-polarizing film of 28 μm in thickness. The color of the light-polarizing film obtained was yellow, and the properties thereof are shown in Table 1 below.

EXAMPLE 4

From an aqueous solution of a PPV precursor, a film of the PPV precursor having a thickness of 45 μm was formed by a casting method. Then, by casting a DMF solution of a PTV precursor shown by formula (III) wherein $R_5$ is a methyl group on the PPV precursor film, the PTV precursor layer of 0.5 μm in thickness was formed thereon to form a composite film composed of the PPV precursor and the PTV precursor. Thereafter, the composite film was stretched 5 times at temperatures of up to 140° C. and then heat-treated at 170° C. for 30 minutes, whereby a light-polarizing film composed of a PPV-PTV composite film was obtained. The properties thereof are shown in Table 1 below.

EXAMPLE 5

After adding C.I. Direct Red 2 and C.I. Direct Blue 202 (all are color index generic names) as dichroic dyes to a mixed aqueous solution of the PPV precursor and PVA as used in Example 3 in amounts of 0.8% by weight and 2.4% by weight, respectively to PVA, the mixture obtained was cast on a polyester film to form a film of about 50 μm in thickness.

The film was uniaxially stretched 4 times and, thereafter, heat-treated for one hour at 120° C., whereby a light-polarizing film of 26 μm in thickness was obtained. The color of the light-polarizing film obtained was gray, and the properties thereof are shown in Table 1 below.

EXAMPLE 6

The light-polarizing films obtained in Example 1 and Example 2 were subjected to a heat resisting test at 100° C. for 500 hours, but no change of the properties was observed before and after the test. The results obtained are shown in Table 2 described hereinafter.

EXAMPLE 7

The light-polarizing films obtained in Example 1 and Example 2 were subjected to a moisture and heat resisting test at 85° C. and 90%RH for 500 hours, but no change of properties was observed before and after the test. The results obtained are shown in Table 2 below.

TABLE 1

| Example No. | Measuring wavelength | Transmittance (%) | Polarizing co-efficient (%) |
| --- | --- | --- | --- |
| 1 | 420 nm | 31 | 99 |
| 2 | 550 nm | 34 | 92 |
|   | Mean value of 400 to 700 nm | 46 | 81 |
| 3 | 420 nm | 31 | 96 |
| 4 | Mean value of 510 to 680 nm | 30 | 88 |
| 5 | Mean value of 400 to 700 nm | 37 | 92 |

TABLE 2

| Example No. | Sample No. | Measuring wavelength | After test (%) (Tr)* | After test (%) (Po)** | Before test (%) (Tr)* | Before test (%) (Po)** |
| --- | --- | --- | --- | --- | --- | --- |
| 6 | Ex. 1 | 420 nm | 31 | 99 | 31 | 99 |
|   | Ex. 2 | 550 nm | 34 | 92 | 34 | 92 |
| 7 | Ex. 1 | 420 nm | 31 | 99 | 31 | 99 |
|   | Ex. 2 | 550 nm | 34 | 92 | 34 | 92 |

(Tr): Transmittance
(Po): Polarizing co-efficient

From the results shown above, it can be seen that the light-polarizing films of this invention are excellent in transmittance and polarizing co-efficient and also are excellent in durability under high-temperature and high-humidity conditions.

The light-polarizing films of this invention also have good durability to chemicals.

The light-polarizing films of this invention are applicable for very wide environmental condition range and can be suitably used for the uses which are required to have durability in wide temperature and humidity ranges, such as liquid crystal display elements, reflection suppression filters, etc., equipped to automobiles, etc.

Furthermore, in the case of a conductive polymer alone having dichroism and represented by formulae (VI), (VII), (VIII), or (IX) or the light-polarizing films of this invention composed of a composite film of a heat-resistant polymer and conductive polymer or a humidity and heat-resistant polymer and conductive polymer, a protective film, a supporting film, etc. are unnecessary, which simplifies the production step for the light-polarizing film and contributes to reduction of cost and, hence, these cases are also industrially useful.

While the invention has been described in detail and with reference to specific embodiments thereof, it will be apparent to one skilled in the art that various changes and modifications can be made therein without departing from the spirit and scope thereof.

What is claimed is:

1. A light-polarizing film as comprising a uniaxially oriented conductive polymer having about 81% or more of a polarizing co-efficient in the wavelength having a minimum transmittance in the range of from 400 to 700 μm, said uniaxially oriented conductive polymer represented by formula (VI)

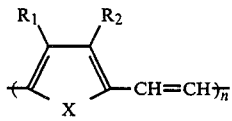 (VI)

wherein X represents a sulfur atom or an oxygen atom; $R_1$ and $R_2$, which may be the same or different, each represents a hydrogen atom, an alkyl group having from 1 to 4 carbon atoms, a nitrile group, a halogen atom, or a trihalomethyl group; and n represents an integer of at least 5, and, wherein the conductive polymer represented by formula (VI) is obtained from a conductive polymer precursor represented by formula (I):

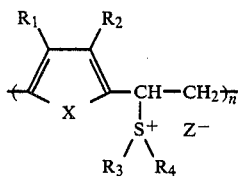 (I)

wherein X represents a sulfur atom or an oxygen atom; $R_1$ and $R_2$, which may be the same or different, each represents a hydrogen atom, an alkyl group having from 1 to 4 carbon atoms, a nitrile group, a halogen atom, or a trihalomethyl group; $R_3$ and $R_4$, which may be the same or different, each represents a hydrogen atom or an alkyl group having from 1 to 4 carbon atoms; $Z^-$ represents an anion; and n represents an integer of at least 5.

2. A light-polarizing film comprising a uniaxially oriented conductive polymer having about 81% or more of a polarizing co-efficient in the wavelength having a minimum transmittance in the range of from 400 to 700 μm, wherein the conductive polymer is a conductive polymer having dichrosim and represented by formula (VII):

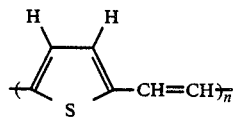 (VII)

wherein n represents an integer of at least 5; and wherein the conductive polymer represented by formula (VII) is obtained from a conductive polymer precursor represented by formula (II) or (III):

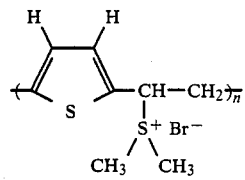 (II)

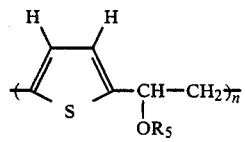 (III)

wherein n represents an integer of at least 5; and in formula (III), $R_5$ represents a hydrogen atom or an alkyl group having from 1 to 4 carbon atoms.

3. A light-polarizing film as claimed in claim 1, wherein the conductive polymer is used as a uniaxially oriented conductive polymer obtained by adsorbing or laminating the conductive polymer on a base polymer, or mixing the conductive polymer with a base polymer and uniaxially orienting the polymer.

4. A light-polarizing film as claimed in claim 1, wherein the conductive polymer is used as a uniaxially oriented conductive polymer obtained by adsorbing or laminating the conductive polymer precursor on a base polymer or mixing the conductive polymer precursor with a base polymer and subjecting to uniaxial stretching and a releasing treatment.

5. A light-polarizing film as claimed in claim 1, wherein the conductive polymer further contains an electron attractive compound or an electron donative compound.

6. A light-polarizing film as claimed in claim 6, wherein the conductive polymer is used together with one or more dichroic dyes.

7. A light-polarizing film as claimed in claim 2, wherein the conductive polymer is used as a uniaxially oriented conductive polymer obtained by adsorbing or laminating the conductive polymer on a base polymer, or mixing the conductive polymer with a base polymer and uniaxially orienting the polymer.

8. A light-polarizing film as claimed in claim 2, wherein the conductive polymer is used as a uniaxially oriented conductive polymer obtained by adsorbing or laminating the conductive polymer precursor with a base polymer and subjecting to uniaxially stretching and a releasing treatment.

9. A light-polarizing film as claimed in claim 2, wherein the conductive polymer further contains an electron attractive compound or an electron donative compound.

10. A light-polarizing film as claimed in claim 2, wherein the conductive polymer is used together with one or more dichroic dyes.

* * * * *

UNITED STATES PATENT AND TRADEMARK OFFICE
CERTIFICATE OF CORRECTION

PATENT NO. : 4,802,745

DATED : February 7, 1989

INVENTOR(S) : Toyokazu Okada, Koji Higashi and Satoshi Taguchi

It is certified that error appears in the above-identified patent and that said Letters Patent is hereby corrected as shown below:

Col. 11, lines 5 and 45: delete "$\mu$m" and insert --nm--.

Signed and Sealed this

Fourteenth Day of January, 1992

*Attest:*

HARRY F. MANBECK, JR.

*Attesting Officer*  *Commissioner of Patents and Trademarks*